United States Patent
Kafer et al.

(10) Patent No.: US 9,113,753 B2
(45) Date of Patent: Aug. 25, 2015

(54) KNEADING DEVICE FOR KNEADING INGREDIENTS INTO DOUGH AND A KNEADING TOOL

(75) Inventors: Monika Kafer, Maria Saal (AT); Wolfgang Moser, Klagenfurt (AT)

(73) Assignee: KONINKLIJKE PHILIPS N.V., Eindhoven (NL)

(*) Notice: Subject to any disclaimer, the term of this patent is extended or adjusted under 35 U.S.C. 154(b) by 1147 days.

(21) Appl. No.: 12/995,682

(22) PCT Filed: Jun. 8, 2009

(86) PCT No.: PCT/IB2009/052422
§ 371 (c)(1),
(2), (4) Date: Dec. 2, 2010

(87) PCT Pub. No.: WO2009/150603
PCT Pub. Date: Dec. 17, 2009

(65) Prior Publication Data
US 2011/0075506 A1 Mar. 31, 2011

(30) Foreign Application Priority Data
Jun. 11, 2008 (EP) ..................... 08157996

(51) Int. Cl.
A21C 1/06 (2006.01)
A47J 43/04 (2006.01)
A47J 43/07 (2006.01)
A21C 1/02 (2006.01)
A47J 43/046 (2006.01)
B01F 7/00 (2006.01)

(52) U.S. Cl.
CPC ............... *A47J 43/0722* (2013.01); *A21C 1/02* (2013.01); *A47J 43/046* (2013.01); *B01F 7/001* (2013.01); *B01F 7/00275* (2013.01); *B01F 7/00325* (2013.01)

(58) Field of Classification Search
CPC ... A47J 43/046; A47J 43/0722; A47J 43/085; A47J 43/06; A47J 43/07; A47J 43/0711; A21C 1/02
USPC .............................. 366/295, 99; 241/199.12
See application file for complete search history.

(56) References Cited

U.S. PATENT DOCUMENTS

| | | | | |
|---|---|---|---|---|
| 1,169,026 | A * | 1/1916 | Genter | .......................... 209/283 |
| 1,675,694 | A * | 7/1928 | Claybourn | ............... 241/199.12 |
| 1,766,942 | A | 6/1930 | Rataiczak et al. | |
| 1,857,361 | A * | 5/1932 | Davis | .............................. 366/99 |
| 2,039,277 | A | 5/1936 | Baehr | |
| 2,529,650 | A * | 11/1950 | Davis | ............................. 384/252 |
| 2,723,839 | A * | 11/1955 | Lorenz et al. | .................. 366/314 |
| 2,991,051 | A * | 7/1961 | Jones | .............................. 366/279 |
| 3,156,278 | A * | 11/1964 | Otto | ........................... 241/282.2 |
| 3,201,095 | A * | 8/1965 | Erwien et al. | .................. 366/314 |

(Continued)

FOREIGN PATENT DOCUMENTS

AU 3056477 A 5/1979
AU 503997 B2 9/1979

(Continued)

*Primary Examiner* — Tony G Soohoo (57) ABSTRACT

A kneading device for kneading dough includes a kneading tool, a driving unit for driving the kneading tool around a central axis, a bowl for accommodating the kneading tool and a base for supporting the bowl. The kneading tool includes a central body having an agitating arm and at least one axially and radially extending wiper.

19 Claims, 10 Drawing Sheets

(56) References Cited

U.S. PATENT DOCUMENTS

| | | | |
|---|---|---|---|
| 3,545,729 A * | 12/1970 | Scholl et al. | 366/314 |
| 3,861,656 A * | 1/1975 | Schmitt | 366/244 |
| 3,938,784 A * | 2/1976 | Moreton | 366/306 |
| 3,963,220 A * | 6/1976 | Ohchi | 366/98 |
| 4,057,226 A * | 11/1977 | de Mos et al. | 366/244 |
| 4,153,210 A * | 5/1979 | Schaeffer | 241/282.1 |
| 4,202,257 A | 5/1980 | Masuda | |
| 4,337,000 A | 6/1982 | Lehmann | |
| 4,551,026 A * | 11/1985 | Cristante | 366/149 |
| 4,571,091 A * | 2/1986 | Pardo et al. | 366/311 |
| 4,842,416 A * | 6/1989 | Kullen et al. | 366/314 |
| 4,878,627 A * | 11/1989 | Otto | 241/199.12 |
| 5,339,998 A * | 8/1994 | Warren | 222/241 |
| 5,535,665 A * | 7/1996 | Wong | 99/348 |
| 5,577,675 A * | 11/1996 | Ishikawa | 241/65 |
| 5,634,600 A * | 6/1997 | Kubota et al. | 241/36 |
| 6,012,837 A * | 1/2000 | Thuma | 366/294 |
| 6,550,372 B1 * | 4/2003 | Sharples | 99/331 |
| 8,635,948 B2 * | 1/2014 | Herren | 99/537 |
| 2001/0046183 A1 * | 11/2001 | Lawson | 366/325.8 |
| 2002/0027175 A1 * | 3/2002 | Capp | 241/199.12 |
| 2003/0193835 A1 * | 10/2003 | Richardson | 366/282 |
| 2011/0075506 A1 * | 3/2011 | Kafer et al. | 366/99 |

FOREIGN PATENT DOCUMENTS

| | | |
|---|---|---|
| EP | 0847225 A2 | 6/1998 |
| EP | 2127578 A1 | 12/2009 |
| FR | 1329317 A | 6/1963 |
| GB | 335059 | 9/1930 |
| WO | 0030517 A1 | 6/2000 |

* cited by examiner

KNEADING DEVICE FOR KNEADING INGREDIENTS INTO DOUGH AND A KNEADING TOOL

FIELD OF THE INVENTION

The invention relates to a kneading device for kneading dough, comprising a kneading tool having a central body with an agitating and kneading means, a driving unit for driving the kneading tool around a central axis, a bowl for accommodating the kneading tool and a base for supporting the bowl.

The invention further relates to a kneading tool for application in such a device.

BACKGROUND OF THE INVENTION

Kneading tools for application in kneading devices, kitchen machines and the like are known from the art. Kneading tools which are inserted into the centre of a bowl of a kitchen machine are known in various designs. Such kneading tools have agitating tool parts and kneading tool parts. In general, the centre of a mixing bowl accommodates a drivable central body carrying such tool parts which may even be of different shape in individual cases. U.S. Pat. No. 4,842,416 discloses a kneading tool having two agitating arms, two scoops and two ribs attached to a swivel. This known kneading tool has many edges and ridges which makes cleaning the tool after use cumbersome.

SUMMARY OF THE INVENTION

It is an object of the invention to provide a kneading device having a kneading tool which is easy to clean and has at least a similar performance as the known devices.

The object of the invention is realized by the kneading device as defined in claim 1. Particularly, the kneading tool of the kneading device according to the invention has only one agitating arm and at least one axially and radially extending wiper.

Preferably, the kneading tool is vertically arranged in the bowl. Usually, the kneading tool is positioned in the centre of the bowl and is drivable by a drive shaft to which it is removably connected. The kneading tool has a central body to which only one agitating arm and at least one wiper are connected. The ingredients of the dough to be kneaded are usually added to the bowl while the driving unit connected to the drive shaft is disengaged from the kneading tool or is inactive. It is also possible to add the ingredients after the driving unit is engaged or is active. When the driving unit connected to the drive shaft is engaged or activated, a rotating movement of the kneading tool around its central axis is caused. Due to the rotation the only one agitating arm and the at least one wiper exercise mixing and kneading forces to the ingredients resulting in a properly kneaded dough. When the desired kneading result has been reached the drive unit is disengaged or switched off to stop the kneading tool, where after the dough can be removed from the bowl. The kneading tool can also be removed from the kneading device and cleaned.

The kneading device according to the invention can be applied for household use as well as for professional use. In professional environments the device can be used on a small scale as well as for large-scale industrial production of dough.

The kneading device can be used for kneading many different types of dough, including but not limited to dough for bread, pastry, cake, pizza and beef tartar. Also kneading of other foodstuffs like mass for sausages can be performed with the kneading device of the invention.

In a preferred embodiment of the kneading device according to the invention a distal end of the at least one wiper has a varying distance to an opposite inner side of the bowl, which distance increases in a direction oriented from the bottom of the bowl towards its top. Due to the created difference in radial distance between the distal end of the at least one wiper and the opposite inner side of the bowl an extra kneading force is exercised on the dough. Furthermore, due to the larger volume in the top area of the bowl the dough tends to fall back to the bottom of the bowl thereby improving the kneading process. In this embodiment the form of the at least one wiper and the form of the bowl are mutually dependent. For substantially cylindrical bowls the distance between the central axis of the central body and the distal end of the top end of the at least one wiper is required to be smaller than the distance between the central axis of the central body and the distal end of the bottom end of the at least one wiper. For a conical shaped bowl this embodiment requires the aforementioned difference to be smaller or zero dependent on the aperture of the bowl. In embodiments with a very large aperture the distance between the central axis of the central body and the distal end of the top end of the at least one wiper may even be bigger than the distance between the central axis of the central body and the distal end of the bottom end of the at least one wiper to reach the desired effect. During operation, a first axis of rotation of the dough is parallel to the axis of rotation of the kneading tool. This rotation is caused by the squeezing of the dough between the at least one wiper and the opposed inner side of the bowl. A second axis of rotation of the dough is perpendicular to the first axis. This rotation is caused by the only one agitating arm running through the lower part of the dough mass.

The central body, the at least one wiper and the agitating arm can be made of for example metal or plastic. Also enforced plastic or glass fiber might be used. In some embodiments these parts can be made from different materials. The bowl can be made of for example metal, plastic or glass. Such materials provide sufficient friction with the dough to be kneaded.

In a preferred embodiment the central body of the kneading tool and the at least one wiper form together a substantially smooth surface. On this substantially smooth surface no ribs, rills or the like are present which facilitates ease of cleaning of the kneading tool.

In a practical embodiment the at least one wiper is an integral part of the central body. Integration of the central body and the wiper yields a smooth connection between the central body and the wiper. Furthermore, this feature reduces production cost.

In a preferred embodiment the at least one wiper is detachably connected to the central body. Different amounts of dough to be kneaded in one and the same bowl may require different wiper sizes for optimal kneading performance. Experimentally it has appeared that it is preferred to enlarge the distance between the most distal part of the at least one wiper as seen from the central body and an opposite inner side part of the bowl as function of the volume of dough to be kneaded in one go. When multiple exchangeable wipers are available for the kneading device, the user can choose which to attach to the central body in order to optimize the kneading performance given the specific dough to be kneaded.

In a practical embodiment there is only one wiper. In this embodiment the wiper is preferably located substantially diametrically to the only one agitating arm. This configuration allows optimal promotion of a bi-directional rotation of the dough and thereby efficient working of the kneading tool.

In other practical embodiments there are multiple wipers. Although preferably, these wipers and the only one agitating arm are distributed evenly over the circumference of the central axis other distributions are possible as well.

In a preferred embodiment the only one agitating arm laterally projects from the central body near to a bottom part of the bowl. Placing the only one agitating arm in this position is advantageous for the mixing of the ingredients during the initial phase of the kneading process.

In a preferred embodiment the central body, the only one agitating arm and the at least one wiper each have a non-stick surface, e.g. made from a sol-gel material or polytetrafluoroethylene (PTFE). This non-stick surface further improves the ease of cleaning of the kneading tool.

In a preferred embodiment a cover is present to cover the bowl during the time the kneading tool is rotating. This cover prevents the dough from becoming polluted by particles falling into the bowl. Furthermore, the cover prevents the dough from escaping the bowl during kneading and attributes to the dough returning to the bowl bottom thereby improving the kneading result. The cover can be made of for example metal, plastic or glass. It is advantageous to make at least a part of either the bowl or the cover from a transparent material allowing the user to monitor the progress of the kneading process during use of the device.

The invention further relates to a kneading tool having a central body having only one agitating arm and at least one wiper to be applied in a kneading device according to the invention.

BRIEF DESCRIPTION OF THE DRAWINGS

A detailed description of the invention is provided below. The description is provided by way of a non-limiting example to be read with reference to the drawings in which.

DETAILED DESCRIPTION OF THE EMBODIMENTS

In figures showing the same embodiment, the same numbers are used for the same parts.

Figure 1:
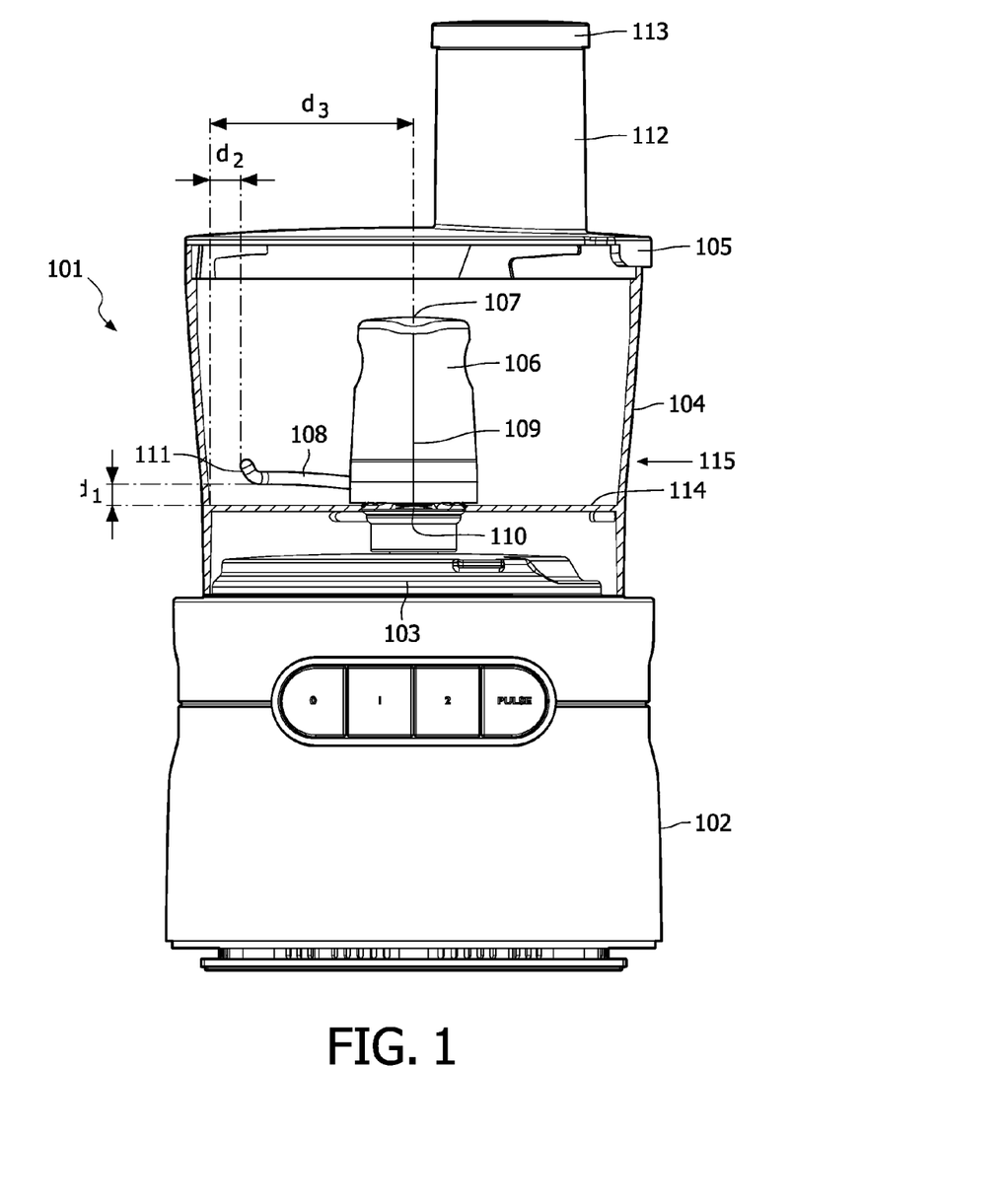
FIG. 1 shows a schematical embodiment of a kneading device according to the invention.

FIG. 1 shows a kneading device 101. The kneading device 101 has a casing 102. The top part of the casing 102 has a base, more particularly a base plate 103, on which a bowl 104 is placed. The bowl 104 has a cover 105. Inside the bowl 104 a kneading tool 106 is present. The kneading tool 106 has a central body 107 to which one agitating arm 108 and one wiper 109 are provided. In FIG. 1 the one agitating arm 108 is connected to the side of the central body 107 which is not visible. Due to the curved form of the agitating arm 108 part of the agitating arm 108 is visible in FIG. 1. The wiper 109 is placed substantially diametrically from the agitating arm 108, and is seen from the front. The kneading tool 106 is drivable by a driving unit 110. The driving unit 110 connects to the bottom of the central body 107 of the kneading tool 106. When the kneading device is switched on, the driving unit 110 starts to rotate. The kneading tool 106 connected to the driving unit 110 will rotate accordingly. The driving unit 110 comprises an electric motor known from the art and not shown in FIG. 1.

When dough is to be kneaded, the bowl 104 is placed on the base plate 103 and the kneading tool 106 is placed in the bowl 104 on top of the driving unit 110. Ingredients are added to the bowl 104 and the cover 105 is positioned to cover the bowl. The driving unit 110 is engaged or activated and the kneading process starts. During a first phase of the kneading process the agitating arm 108 mixes the ingredients until a dough mass comes into being. It is advantageous to position the agitating arm at some distance $d_1$ from the bottom 114 of the bowl to facilitate good mixing of the ingredients during the first phase of the kneading process. Good kneading results are obtained when $d_1$ has a value between 6 mm and 15 mm. Preferably $d_1$ has a value between 8 mm and 12 mm. Very good kneading results are obtained when $d_1$ has a value of substantially 10 mm. Furthermore, it is advantageous to the kneading process to position the distal end of the agitating arm near to the opposite inner side of the bowl. In FIG. 1 this distance is indicated by $d_2$. Good kneading results are obtained when $d_2$ has a value between 2% and 15% of the distance between the central axis and the opposite inner side of the bowl, indicated in FIG. 1 by $d_3$. Preferably $d_2$ has a value between 5% and 10% of $d_3$. Very good kneading results are obtained when $d_2$ has a value of substantially 7% of $d_3$.

During later phases of the kneading process the dough is starting to form a more coherent mass. In these phases the wiper 109 takes part in the kneading by squeezing the dough between itself and the opposite inner side of the bowl. The agitating arm 108 runs through the bottom part of the dough mass, causing a rotational movement of the dough mass.

The cover 105 prevents pollution from falling into the bowl 104 during the kneading process. Furthermore, the cover 105 prevents the dough from escaping the bowl 104 during the kneading process. In this embodiment the cover 105 has a feeding tube 112, whereby additional ingredients can be added to the dough through the feeding tube during the kneading process. The feeding tube 112 is covered with a feeding tube cover 113.

The central body 107, the wiper 109 and the agitating arm 108 can be made of for example metal or plastic. In some embodiments these parts can be made from different materials. Following the mixing phase of the kneading process the forces exercised on the agitating arm are such that it is preferable to construct this arm from metal, an enforced plastic or glass fiber.

To improve ease of cleaning, one or more parts like the central body, the only one agitating arm and the wiper might have a non-stick surface, e.g. made from a sol-gel material or polytetrafluoroethylene (PTFE).

The bowl 104 and the cover 105 can be made of for example metal, plastic or glass. It is advantageous to make at least part of the bowl or the cover from a transparent material such that the user can observe the kneading process.

Figure 2:
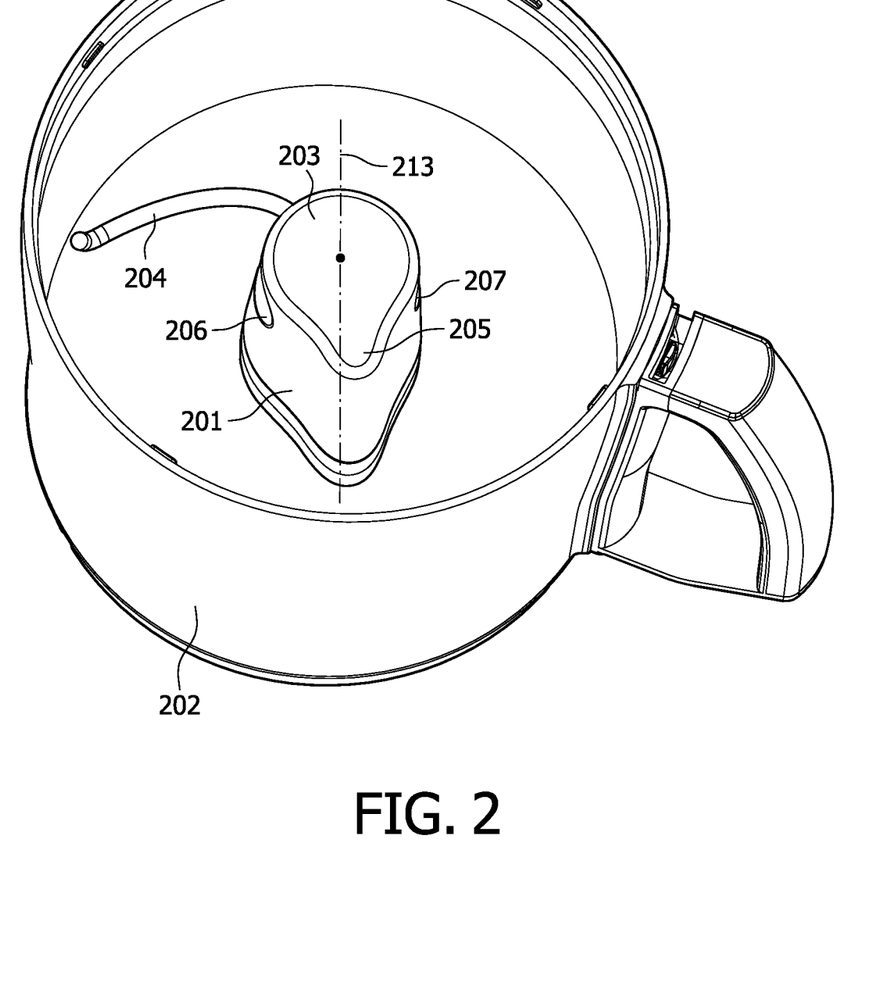
FIG. 2 shows a schematic view of an embodiment of a kneading tool with an integrated wiper inside a bowl, seen according to a top perspective.

FIG. 2 shows a kneading tool 201 arranged inside a bowl 202. The kneading tool 201 has a central body 203 to which one more or less radially extending agitating arm 204 and one axially and radially extending wiper 205 are connected. The wiper 205 extends axially and radially with respect to the central body 203. The central body 203 and the wiper 205 form one integral unit. The kneading tool is bottom-drivable, wherein the central body 203 is rotatable around a central axis 213. Two smoothly formed notches 206 and 207 are present on the side of the central body 203. The user can put his or her fingers in these notches to easily push the kneading tool 201 onto its driving mechanism before use, or to remove the kneading tool 201 from the bowl after use. The kneading tool 201 is preferably placed in the bowl 202 before the ingredients, which are not shown in this figure, are added. In general, the dough, which is not shown in this figure, is removed from the bowl before the kneading tool 201 is removed.

Figure 3:
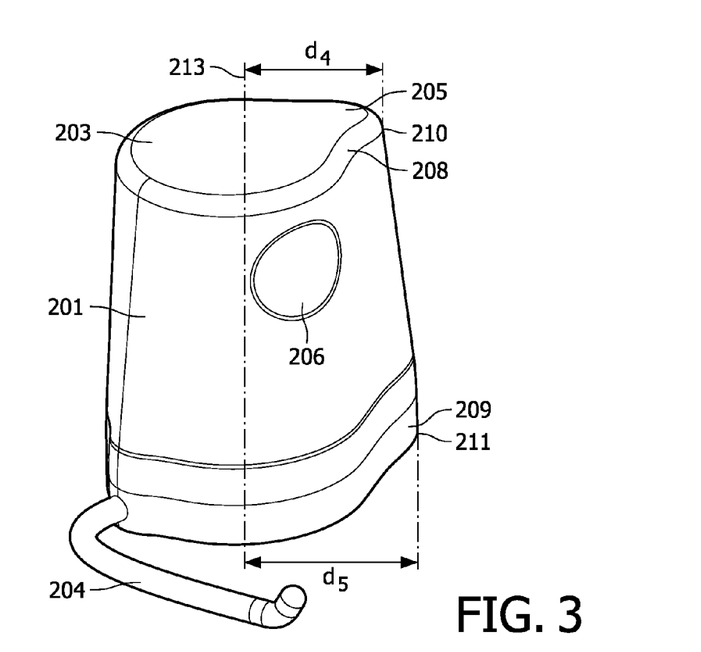
FIG. 3 shows the kneading tool shown in FIG. 2, seen according to a side perspective.

FIG. 3 shows the kneading tool of FIG. 2 in more detail. To the kneading tool 201 one agitating arm 204 and one wiper 205 are connected. The smoothly formed notch 206 is visible. The wiper 205 is integrated with the central body 203. The distance $d_4$ between the central axis 213 of the central body 203 and the distal end 210 of the top part 208 of the wiper is smaller than the distance $d_5$ between the central axis 213 and the distal end 211 of the bottom part 209 of the wiper 205. Due to the shape resulting from the mentioned measure, the kneading tool 201 shown in FIG. 3 is suitable for application in a substantially cylindrical bowl as shown in FIG. 2 as the distance between the distal end 210 of the top part 208 of the wiper 205 and the opposite inner side of the bowl 202 is larger than the distance between the distal end 211 of the bottom part 209 of the wiper 205 and the opposite inner side of the bowl 202. Due to this difference the volume available for the dough near the top of the bowl 202 is larger than near the bottom of the bowl. This volume difference contributes to the dough movement towards the bottom of the bowl during kneading.

Figure 4:
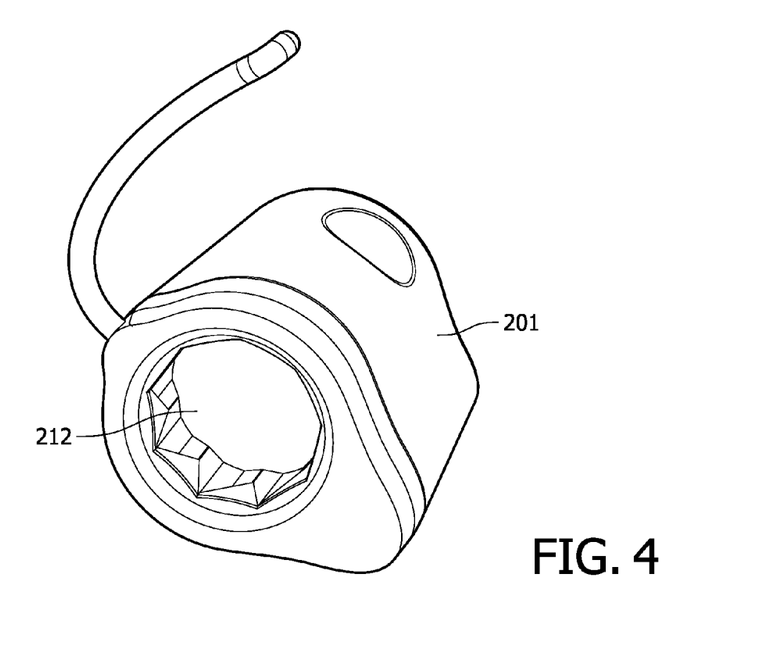
FIG. 4 shows the kneading tool shown in FIG. 2, seen according to a bottom perspective.

FIG. 4 shows a bottom view of the kneading tool of FIG. 2. In this figure a coupling area 212 of the kneading tool 201 is visible. Before use the kneading tool 201 is positioned in the kneading device on top of a driving mechanism which has a driving part corresponding to the coupling area 212. The driving mechanism corresponding to this coupling area is described in more detail in patent application EP 08157301 (herewith incorporated by reference). When the driving mechanism is engaged and starts rotating, the kneading tool 201 is forced to rotate as it is coupled to the driving mechanism by the cooperating geometry of the driving part and the coupling area 212.

Figure 5:
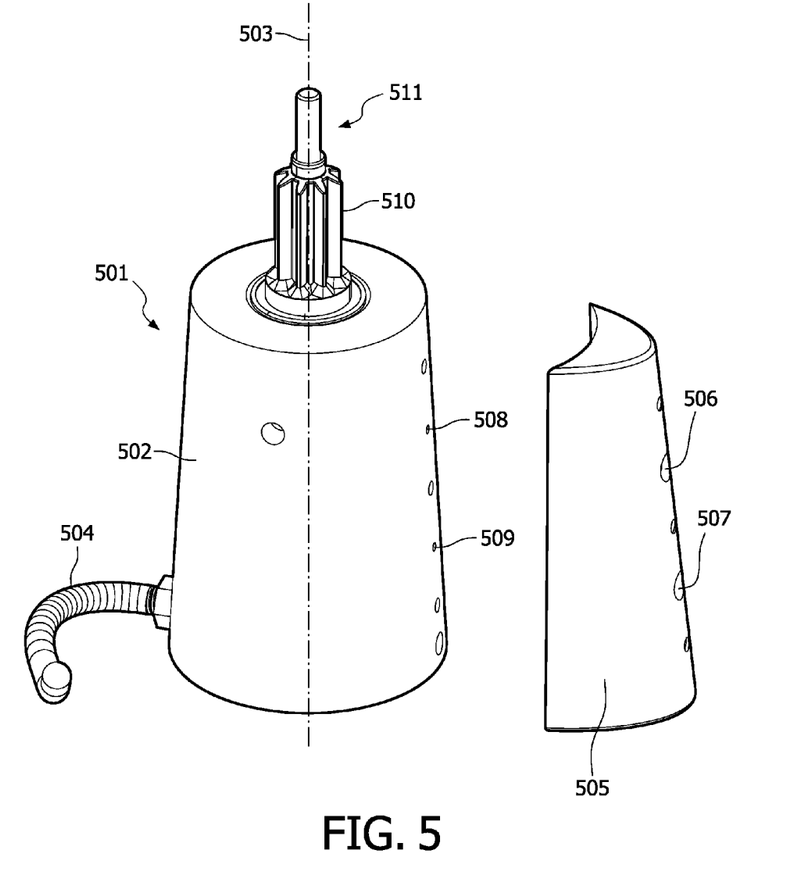
FIG. 5 shows a schematical embodiment of the kneading tool according to the invention with a removable wiper seen according to a side perspective.

FIG. 5 shows a top-drivable kneading tool with one detachable wiper. The kneading tool 501 has a central body 502 having a central axis 503. To the central body 502 an agitating arm 504 is connected. In this embodiment a wiper 505 is shown detached from the central body 502. The wiper 505 can be attached to central body 502 by screwing; alternatively this might be done with a snap construction, by press fitting or any other method for detachably connecting known by a person skilled in the art. On the wiper screw holes 506 and 507 are present through which screws can be applied. The central body 502 has two corresponding holes 508 and 509 to receive the screws.

The kneading tool 501 is top-drivable through a coupling mechanism 511 which is provided with a gearwheel 510. Through a corresponding gearwheel of a driving mechanism, which may be known per se and is not shown in this figure, a rotating movement is transferred from the driving mechanism to the kneading tool 501 when the driving mechanism is engaged or activated. The central body 502 and the agitating arm 504 are made of metal, particularly stainless steel. The wiper 505 is made of a suitable plastic.

Figure 6:
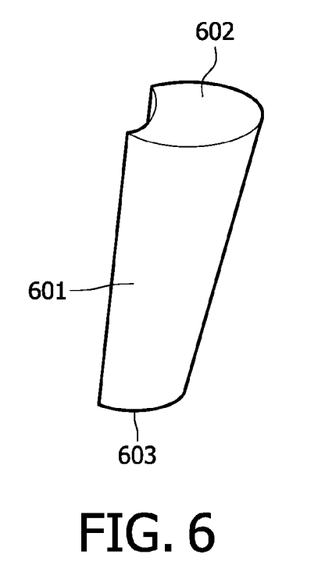
FIG. 6 shows a schematical embodiment of a detachable wiper seen according to a side perspective.
Figure 7:
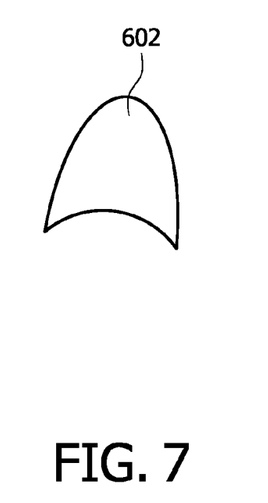
FIG. 7 shows the wiper shown in FIG. 6 from a top perspective.

FIG. 6 shows a schematical embodiment of a detachable wiper seen according to a side perspective. The wiper 601 has a substantially elliptical radial profile. The top part 602 of the wiper 601 has a larger area than the bottom part 603. FIG. 7 shows the top part 602 of the wiper 601 in more detail.

Figure 8:
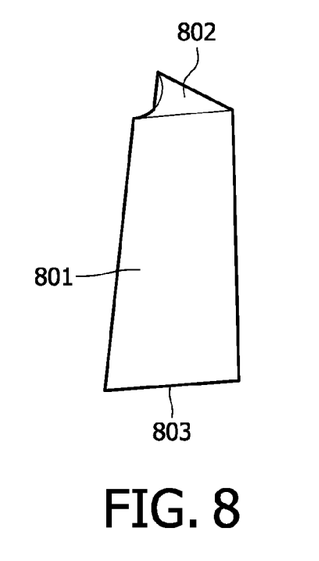
FIG. 8 shows a schematical embodiment of a detachable wiper seen according to a side perspective.
Figure 9:
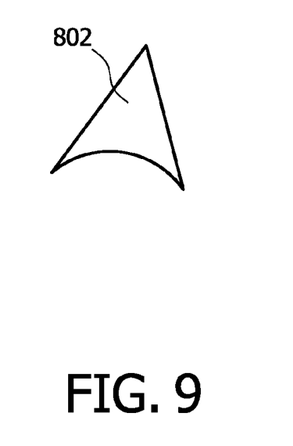
FIG. 9 shows the wiper shown in FIG. 8 from a top perspective.

FIG. 8 shows a schematical embodiment of a detachable wiper seen according to a side perspective. The wiper 801 has a substantially triangular radial profile. The bottom part 803 of the wiper 801 has a larger area than the top part 802. FIG. 9 shows the top part 802 of the wiper 801 in more detail.

Figure 10:
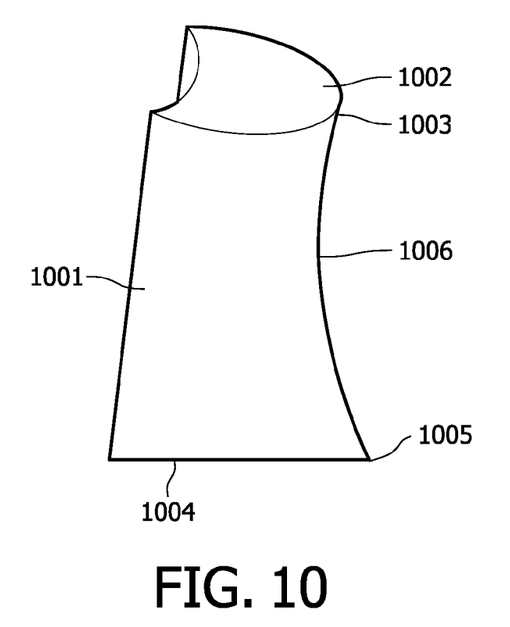
FIGS. 10 and 11 show schematical embodiments of a detachable wiper with similar top having different radial profiles.

FIG. 10 shows a schematical embodiment of a detachable wiper seen according to a side perspective. The wiper 1001 has a top part 1002 and a bottom part 1004. The top part 1002 has a smaller area than bottom part 1004. The outer contour 1006 running from the distal end of the top of the wiper 1003 to the distal end of the bottom of the wiper 1005 is formed as a convex curve.

Figure 11:
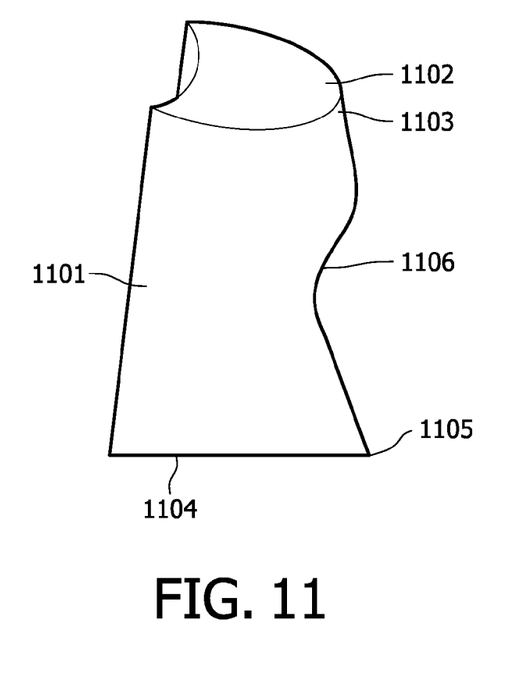

FIG. 11 shows a schematical embodiment of a detachable wiper seen according to a side perspective. The wiper 1101 has a top part 1102 and a bottom part 1104. The top part 1102 has a smaller area than bottom part 1104. The outer contour 1106 running from the distal end of the top of the wiper 1103 to the distal end of the bottom of the wiper 1105 is formed as a concave curve.

Figure 12:
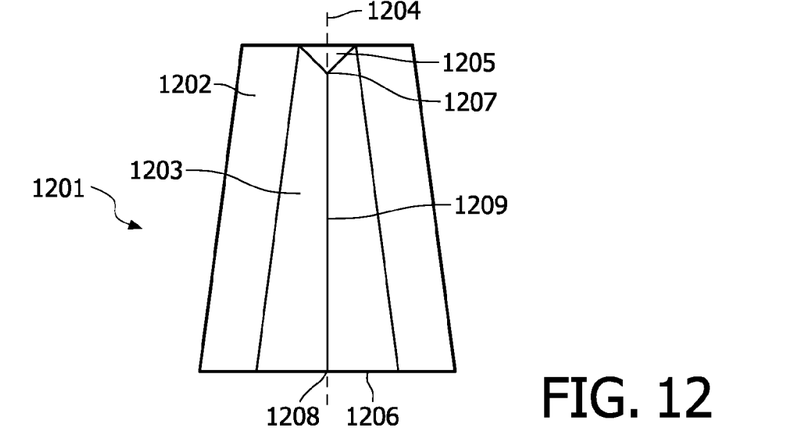
FIGS. 12, 13 and 14 show schemetical embodiments of a wiper attached to the central body having different axial profiles seen from a side perspective.

FIG. 12 shows a schematical embodiment of a kneading tool with one wiper integrated with the central body seen from a side perspective. The kneading tool 1201 has a central body 1202. To this central body 1202 a wiper 1203 is attached. Wiper 1203 has a top 1205 and a bottom 1206. The line 1209 connecting the distal end 1207 of top of the wiper 1205 and the distal end 1208 of the bottom of the wiper 1206 runs substantially parallel in the plane spun by the central axis 1204 and the distal part 1207 of the top of the wiper 1205.

Figure 13:
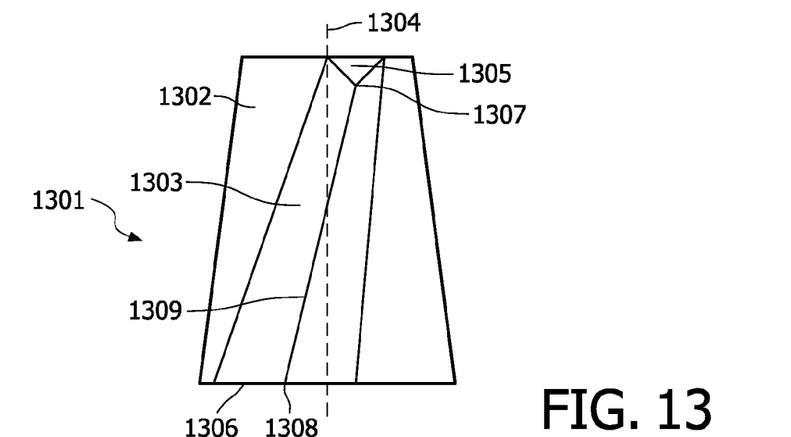

FIG. 13 shows a schematical embodiment of a kneading tool with one wiper integrated with the central body seen from a side perspective. The kneading tool 1301 has a central body 1302. To this central body 1302 a wiper 1303 is attached. Wiper 1303 has a top 1305 and a bottom 1306. The line 1309 connecting the distal end 1307 of top of the wiper 1305 and the distal end 1308 of the bottom of the wiper 1306 runs in a different plane than the plane spun by the central axis 1304 and the distal part 1307 of the top of the wiper 1305.

Figure 14:
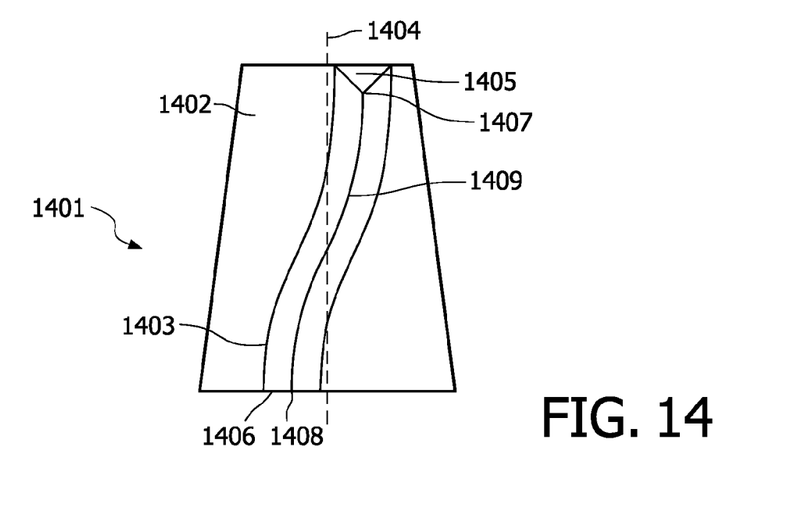

FIG. 14 shows a schematical embodiment of a kneading tool with one wiper integrated with the central body seen from a side perspective. The kneading tool 1401 has a central body 1402. To this central body 1402 a wiper 1403 is attached. Wiper 1403 has a top 1405 and a bottom 1406. The line 1409 connecting the distal end 1407 of top of the wiper 1405 and the distal end 1408 of the bottom of the wiper 1406 following the contour of the wiper is a curved line.

Figure 15:
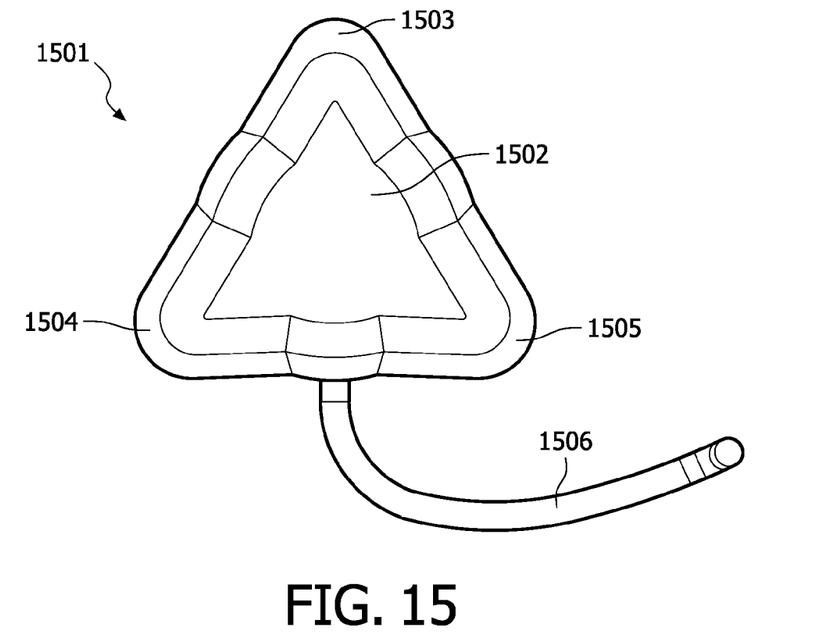
FIG. 15 shows a schematical embodiment of a kneading tool with three wipers according to a top perspective.

FIG. 15 shows a schematical embodiment of a kneading tool with three wipers according to a top perspective. The kneading tool 1501 has a central body 1502 to which three wipers 1503, 1504 and 1505 are integrated. The central body 1502 and the wipers 1503, 1504 and 1505 together have a substantially triangular form seen from this top perspective, with each side having substantially the same length. The wipers 1503, 1504 and 1505 form the corners of this configuration. On one of the sides of the central body the only one agitating arm 1506 is connected.

Figure 16:
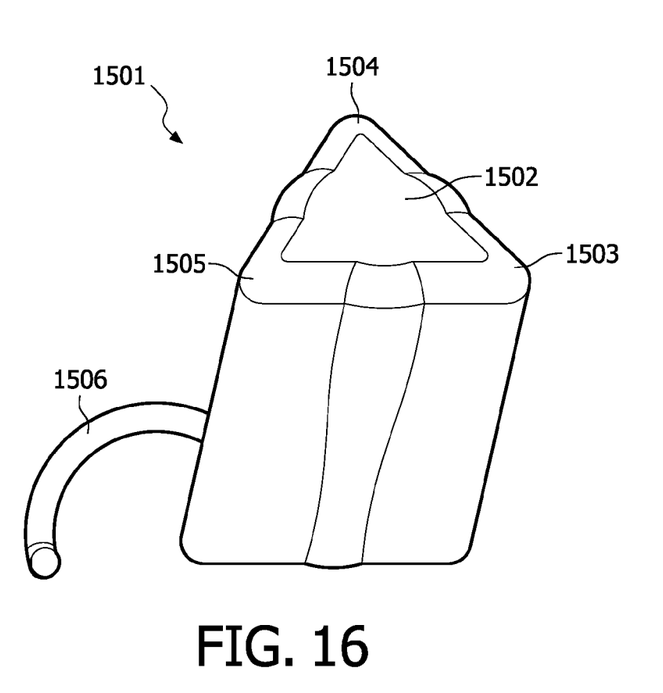
FIG. 16 shows the kneading tool shown in FIG. 15 according to a side perspective.

FIG. 16 shows the kneading tool shown in FIG. 15 according to a side perspective.

Figure 17:
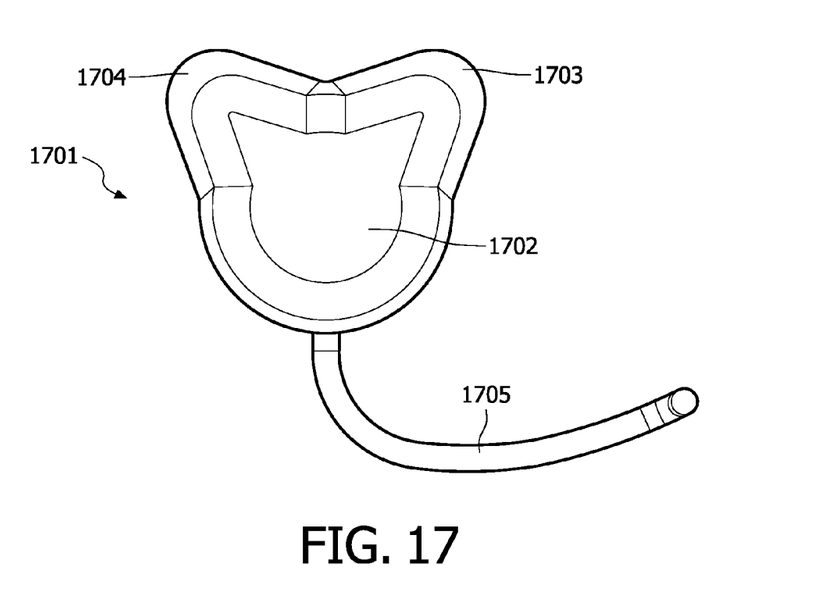
FIG. 17 shows a schematic view of an embodiment of a kneading tool with two integrated wipers according to a top perspective.

FIG. 17 shows a schematic view of an embodiment of a kneading tool with two integrated wipers according to a top perspective. The kneading tool 1701 has a central body 1702 to which two wipers 1703 and 1704 are integrated. To the central body 1702 the only one agitating arm 1705 is connected.

Figure 18:
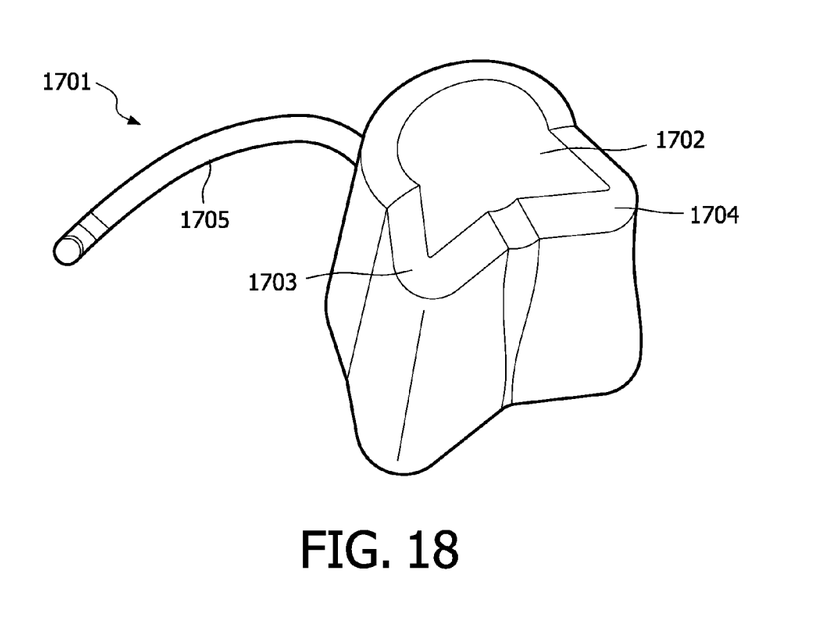
FIG. 18 shows the kneading tool shown in FIG. 17 according to a side perspective.

FIG. 18 shows the kneading tool shown in FIG. 17 according to a side perspective.

Figure 19:
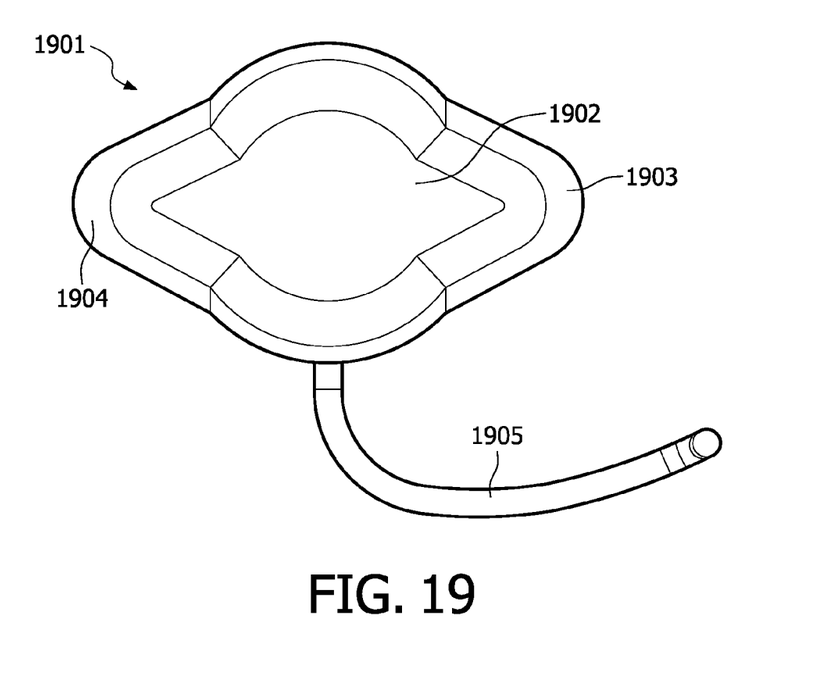
FIG. 19 shows a schematic view of another embodiment of a kneading tool with two integrated wipers according to a top perspective.

FIG. 19 shows a schematic view of another embodiment of a kneading tool with two integrated wipers according to a top perspective. The kneading tool 1901 has a central body 1902 to which two wipers 1903 and 1904 are integrated. To the central body 1902 the only one agitating arm 1905 is connected.

Figure 20:
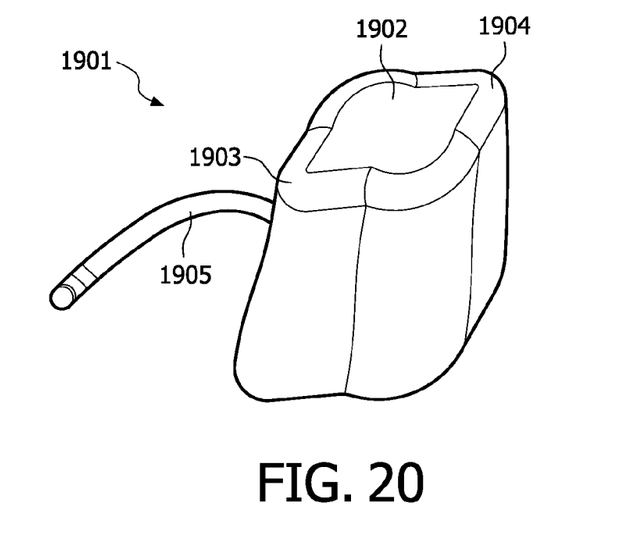
FIG. 20 shows the kneading tool shown in FIG. 19 according to a side perspective.

FIG. 20 shows the kneading tool shown in FIG. 19 according to a side perspective.

LIST OF REFERENCE NUMERALS 101 kneading device
102 kneading device casing
103 base plate
104 kneading bowl
105 cover of kneading bowl
106 kneading tool
107 central body of the kneading tool
108 agitating arm
109 wiper
110 driving unit
111 distal end of agitating arm
112 feeding tube
113 feeding tube cover
114 kneading bowl bottom
115 bottom part of kneading bowl
201 kneading tool
202 bowl
203 central body of kneading tool
204 agitating arm
205 wiper
206 notch
207 notch
208 top part of wiper
209 bottom part of wiper
210 distal end of top part of wiper
211 distal end of bottom part of wiper
212 coupling area
213 central axis of central body
501 kneading tool
502 central body of kneading tool
503 central axis of kneading tool
504 agitating arm
505 detachable wiper
506 screw hole on wiper
507 screw hole on wiper
508 screw hole on central body
509 screw hole on central body
510 gearwheel of coupling mechanism
511 coupling mechanism
601 detachable wiper
602 top of detachable wiper
603 bottom of detachable wiper
801 detachable wiper
802 top of detachable wiper
803 bottom of detachable wiper
1001 detachable wiper
1002 top of detachable wiper
1003 distal end of the top of detachable wiper
1004 bottom of detachable wiper
1005 distal end of the bottom of the detachable wiper
1006 outer contour of the wiper
1101 detachable wiper
1102 top of detachable wiper
1103 distal end of the top of detachable wiper
1104 bottom of detachable wiper
1105 distal end of the bottom of the detachable wiper
1106 outer contour of the wiper
1201 kneading tool
1202 central body
1203 wiper
1204 central axis
1205 top of wiper
1206 bottom of wiper
1207 distal end of top of wiper
1208 distal end of bottom of wiper
1209 line connecting distal ends
1301 kneading tool
1302 central body
1303 wiper
1304 central axis
1305 top of wiper
1306 bottom of wiper
1307 distal end of top of wiper
1308 distal end of bottom of wiper
1309 line connecting distal ends
1401 kneading tool
1402 central body
1403 wiper
1404 central axis
1405 top of wiper
1406 bottom of wiper
1407 distal end of top of wiper
1408 distal end of bottom of wiper
1409 line connecting distal ends
1501 kneading tool
1502 central body
1503 first wiper
1504 second wiper
1505 third wiper
1506 only one agitating arm
1701 kneading tool
1702 central body
1703 first wiper
1704 second wiper
1705 only one agitating arm 1901 kneading tool
1902 central body
1903 first wiper
1904 second wiper
1905 only one agitating arm

The invention claimed is:

1. A kneading device for kneading a dough, comprising:
a kneading tool having a central body with an agitating arm and a wiper;
a driver configured to drive the kneading tool around a central axis;
a bowl configured to accommodate the kneading tool; and
a base for supporting the bowl,
wherein the wiper extends radially away from the central axis towards an inner side of the bowl to form a distal end between a top part of the wiper and a bottom part of the wiper, the top part of the wiper being away from a bottom of the bowl and the bottom part of the wiper near the bottom of the bowl,
wherein a first distance between the distal end and the central axis, near the bottom of the bowl, is larger than a second distance between the distal end of the wiper and the central axis near a top of the bowl opposite the bottom of the bowl, and
wherein the central body is configured to receive wipers of different shapes.

2. The kneading device according to claim 1, wherein the kneading tool is detachably connected to the kneading device.

3. The kneading device according to claim 1, wherein the central body and the wiper form together a substantially smooth surface.

4. The kneading device according to claim 1, wherein the wiper is formed as an integral part of the central body.

5. The kneading device according to claim 1, wherein the wiper is detachably connected to the central body.

6. The kneading device according to claim 1, wherein the agitating arm radially projects from the central body near to the bottom of the bowl.

7. The kneading device according to claim 1, wherein the central body, the agitating arm and the wiper each has a non-stick surface.

8. The kneading device according to claim 1, wherein the bowl is covered by a cover.

9. The kneading device of claim 1, wherein the agitating arm of the kneading tool is an only agitating arm extending further away from the central axis than the wiper.

10. The kneading device of claim 9, wherein the wiper is located substantially diametrically to the only agitating arm.

11. The kneading device of claim 1, wherein the wiper is located substantially diametrically to the agitating arm.

12. The kneading device of claim 1, wherein a distal end of the agitating arm is positioned from an opposite inner side of the bowl at a value between 2% and 15% of a distance between the central axis and the opposite inner side of the bowl.

13. The kneading device of claim 1, wherein the wiper has a cross-section being one of an elliptical and a triangular shape.

14. The kneading device of claim 1, wherein the distal end of the wiper has a contour being one of linear, curved, convex and concave shape.

15. The kneading device of claim 1, wherein the distal end of the wiper is one of linear and parallel to the central axis, linear and not parallel to the central axis, and curved.

16. The kneading device of claim 1, wherein the kneading tool comprises three of the wipers forming a triangle, wherein the agitating arm extends from a side of the triangle, and wherein the three wipers form corners of the triangle.

17. The kneading device of claim 1, wherein the wiper has a cross-section of an elliptical shape.

18. The kneading device of claim 1, wherein the distal end of the wiper has a contour being one of convex and concave shape.

19. A kneading tool for insertion in a bowl of a kneading device, the kneading tool comprising:
a body having a central axis
an agitating arm; and
a wiper,
wherein a first distance between a distal end of the wiper away from the central axis and the central axis, near a bottom of the kneading tool close to a bottom of the bowl when inserted in the bowl, is larger than a second distance near a top of the bowl opposite the bottom of the bowl between the distal end of the wiper and the central axis, and
wherein the body is configured to receive wipers of different shapes.

* * * * *